United States Patent
Otsuka

(10) Patent No.: US 8,201,882 B2
(45) Date of Patent: Jun. 19, 2012

(54) CLUTCH MECHANISM FOR VEHICLE SEAT

(75) Inventor: Taiyo Otsuka, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 476 days.

(21) Appl. No.: 12/555,214

(22) Filed: Sep. 8, 2009

(65) Prior Publication Data

US 2010/0060049 A1     Mar. 11, 2010

(30) Foreign Application Priority Data

Sep. 10, 2008  (JP) ................. 2008-232020

(51) Int. Cl.
*B60N 2/427*   (2006.01)
*B60N 2/48*    (2006.01)

(52) U.S. Cl. ........................ 297/216.12; 297/216.14

(58) Field of Classification Search ............ 297/216.12, 297/216.13, 216.14
See application file for complete search history.

(56) References Cited

U.S. PATENT DOCUMENTS

| | | | |
|---|---|---|---|
| 7,523,987 B2 * | 4/2009 | Yamaguchi .............. | 297/216.12 |
| 2005/0280296 A1 * | 12/2005 | Ohchi et al. ............ | 297/216.12 |
| 2009/0126520 A1 | 5/2009 | Yamaguchi et al. | |
| 2009/0167066 A1 * | 7/2009 | Mori et al. ............... | 297/216.12 |

FOREIGN PATENT DOCUMENTS

| | | | |
|---|---|---|---|
| DE | 102006004905 A1 * | 8/2006 | |
| JP | 2005-95237 | 4/2005 | |

OTHER PUBLICATIONS

U.S. Appl. No. 12/555,204 entitled Clutch Mechanism for Vehicle Seat filed Sep. 8, 2009.
English language Abstract of JP 2005-95237, Apr. 14, 2005.

* cited by examiner

*Primary Examiner* — Anthony D Barfield
(74) *Attorney, Agent, or Firm* — Greenblum & Bernstein, P.L.C.

(57) ABSTRACT

A clutch mechanism for a vehicle seat is provided. The clutch mechanism includes a pressure-receiving member rotatably assembled to a frame of a seatback of the vehicle seat, a connecting arm having a weight and a pin, and provided rotatably to the pressure-receiving member, and a swinging member provided rotatably to the frame, and including a rib which is formed with a cutout capable of receiving the pin. While inertia force occurring due to a crash of a vehicle from behind acts on the weight, when the pressure-receiving member rotates upon receipt of a seatback load of a passenger of the vehicle seat, the connecting arm moves along with the rotation of the pressure-receiving member so that the pin of the connecting arm pushes either one of an edge of the rib and a cutout of the rib while entering the cutout, to rotate the swinging member.

6 Claims, 8 Drawing Sheets

CLUTCH MECHANISM FOR VEHICLE SEAT

BACKGROUND OF THE INVENTION

1. Field of the Invention

The present invention relates to a clutch mechanism for a vehicle seat.

2. Description of the Related Art

A related-art clutch mechanism for a vehicle seat is described in JP-A-2005-95237. This vehicle seat includes a seatback and a headrest body supported above the seatback. The seatback includes therein an acceleration detecting mechanism, and a movement detecting mechanism which detects a movement of a passenger. Specifically, the movement detecting mechanism includes a detecting arm having extending part, and a base part which is supported rotatably to the seatback and formed with ratchet teeth. The acceleration detecting mechanism includes a swinging member with a weight which is provided rotatably to the base part and has ratchet teeth. When inertia force occurring due to a crash of a vehicle from behind acts on the weight, the swinging member rotates and the ratchet teeth of the swinging member become engagement with the ratchet teeth of the base part. In this state, upon receipt of a seatback load of a passenger on the vehicle seat, the detecting arm rotates and this rotation transmits to the swinging member, which activates the headrest body to protrude frontwardly toward the passenger's head. Accordingly, when a vehicle is crashed from behind, the back of the passenger's head can be instantaneously received.

However, according to the above-described clutch mechanism, if a body size of a passenger is large, the ratchet teeth of the swinging member might fail to engage with the ratchet teeth of the base part. Therefore, even when inertia force acts on the weight, the rotation of the detecting arm might not be transmitted to the swinging member.

SUMMARY OF THE INVENTION

It is an aspect of the present invention to provide a clutch mechanism for a vehicle seat which can transmit, to a swinging member, only a passenger's seatback load occurring due to a crash of a vehicle from behind even when a passenger varies with regard to a body size.

According to an exemplary embodiment of the present invention, there is provided a clutch mechanism for a vehicle seat. The clutch mechanism comprises: a pressure-receiving member rotatably assembled to a frame of a seatback of the vehicle seat; a connecting arm having a weight and a pin, and provided rotatably to the pressure-receiving member; and a swinging member provided rotatably to the frame of the seatback of the vehicle seat, and including a rib which is formed with a cutout capable of receiving the pin of the connecting arm. While inertia force occurring due to a crash of a vehicle from behind acts on the weight, when the pressure-receiving member rotates upon receipt of a seatback load of a passenger of the vehicle seat, the connecting arm moves along with the rotation of the pressure-receiving member so that the pin of the connecting arm pushes either one of (i) an edge of the rib and (ii) a cutout of the rib while entering the cutout, to rotate the swinging member.

According to this configuration, when a lightweight passenger sits on a vehicle seat or even when a heavyweight passenger sits on a vehicle seat, only seatback load of the passenger occurring due to a crash of a vehicle from behind can be transmitted to the swinging member. Therefore, even when the passenger varies with regard to a body size, only seatback load of the passenger occurring due to a crash of a vehicle from behind can be transmitted to the swinging member.

In the above-described clutch mechanism, which one of the edge of the rib and the cutout of the rib the pin of the connecting arm pushes may depend on the seatback load of the passenger before the crash of the vehicle.

In the above-described clutch mechanism, the frame may include a rib formed with an elongated hole in which the pin of the connecting arm is movable. When the inertia force occurring due to a crash of a vehicle from behind acts on the weight, the pin of the connecting arm may move along a first surface of the elongated hole to push the swinging member. When the inertia force does not act on the weight, the pin of the connecting arm may move along a second face opposite to the first surface without pushing the swinging member.

In the above-described clutch mechanism, the rib may be formed with a plurality of cutouts along a direction in which the pin of the connecting arm moves to rotate the swinging member.

According to this configuration, even when the passenger is much heavier, the pin of the connecting arm fits into any of a plurality of cutouts; hence, seatback load of the passenger occurring due to a crash of a vehicle from behind can be transmitted to the swinging member as in the case of the heavyweight passenger as described above.

In the above-described configuration, the seatback may include a lock mechanism. The lock mechanism may be connected to the swinging member via a transmission member. The lock mechanism may be unlocked via the transmission member along with the rotation of the swinging member.

According to this configuration, tensile force is exerted on the transmission member by utilization of rotating action of the swinging member, so that the lock mechanism can be unlocked.

In the above-described configuration, the seatback may include an active headrest assembled thereto, which includes a support plate which springs toward a back of the passenger's head. The support plate may be held by the lock mechanism in an initial state achieved before the support plate spring out, and may spring out toward the back of the passenger's head along with the unlocking of the lock mechanism.

According to the configuration, the support plate can be caused to spring out toward the back of the passenger's head by seatback load of the passenger occurring due to a crash of a vehicle form behind. Therefore, when a vehicle is crashed from behind, the support plate can instantaneously receive the back of the passenger's head.

DETAILED DESCRIPTION

Figure 12:
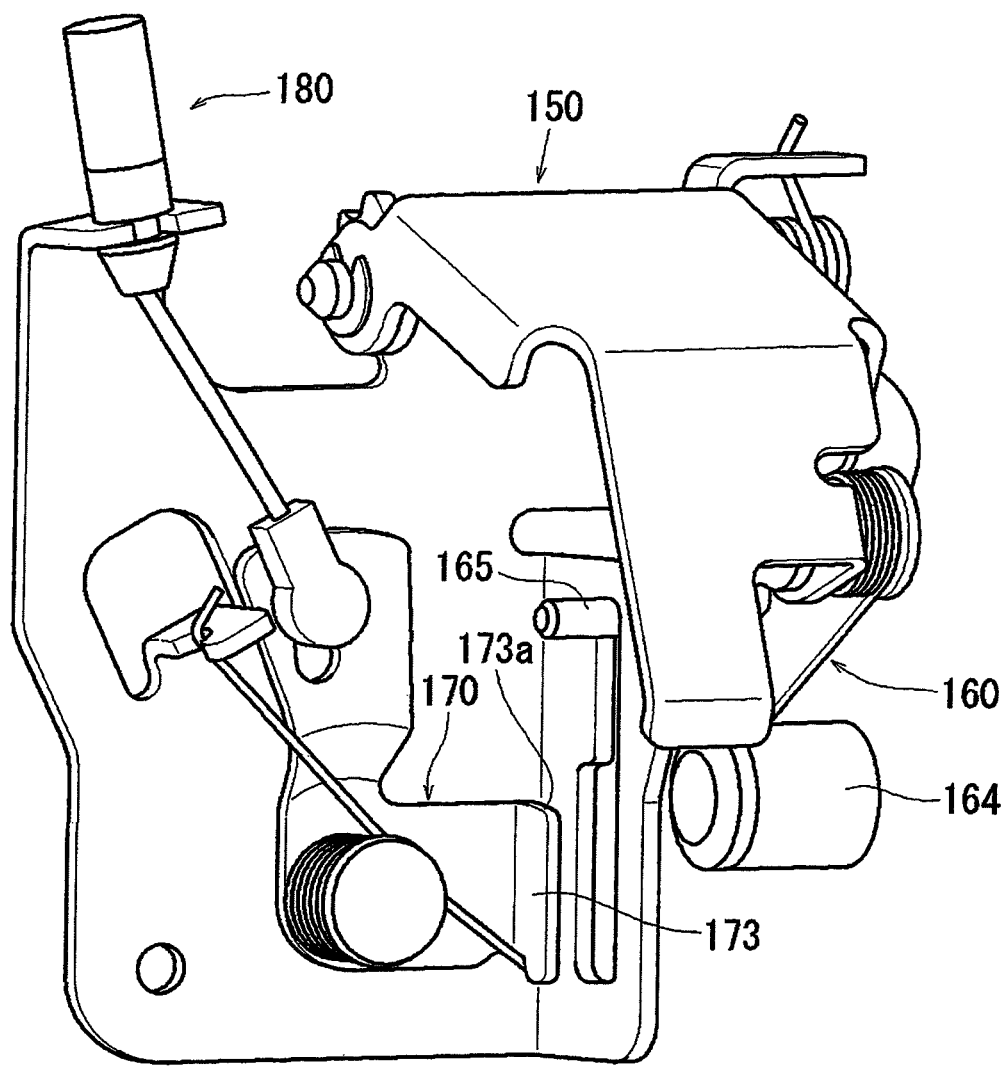
FIG. 12 is an enlarged view of a related-art clutch mechanism.

Exemplary embodiments of the present invention will be described by reference to the drawings. However, firstly, a related-art clutch mechanism will be described by reference to FIG. 12. The related-art clutch mechanism shown in FIG. 12 includes a pressure-receiving member 150 rotatably assembled to a frame (not shown) of a seatback; a connecting arm 160 having a weight 164 provided rotatably to the pressure-receiving member 150; and a swinging member 170 rotatably provided to the frame of the seatback. While inertia force occurring due to a crash of a vehicle from behind acts on the weight 164, when the pressure-receiving member 150 rotates upon receipt of a seatback load of a passenger of the vehicle seat, the connecting arm 160 moves along with the rotation of pressure-receiving member 150 so that a pin 165 formed on the connecting arm 160 pushes an upper edge 173a of a rib 173 formed on the swinging member 170 to rotate the swinging member 170. Accordingly, only the seatback load of a passenger occurring due to a crash of a vehicle from behind can be transmitted to the swinging member 170. Herein, tensile force is exerted on an operation cable 180 along with the rotation of the swinging member 170, thereby momentarily activating an active headrest (not shown) toward a back of the passenger's head. Accordingly, when a vehicle is crashed from behind, the back of the passenger's head can be instantaneously received.

According to the above-described configuration, when the pressure-receiving member 150 receives a seatback load of a heavyweight passenger, the pin 165 of the connecting arm 160 greatly moves in a downward direction in a normal state. Accordingly, the pin 165 of the connecting arm 160 will be situated at a position that is lower than the upper edge 173a of the rib 173 of the swinging member 170 before occurrence of a crash of a vehicle from behind. When the vehicle is crashed from behind while the pin is situated at such a lower position, the pin 165 of the connecting arm 160 moves along a longitudinal wall of the rib 173 of the swinging member 170 and therefore cannot turn the swinging member 170.

The exemplary embodiments of the present invention provides a clutch mechanism for a vehicle seat which can transmit, to a swinging member, only a passenger's seatback occurring due to a crash of a vehicle from behind even when a passenger varies with regard to a body size.

Figure 1:
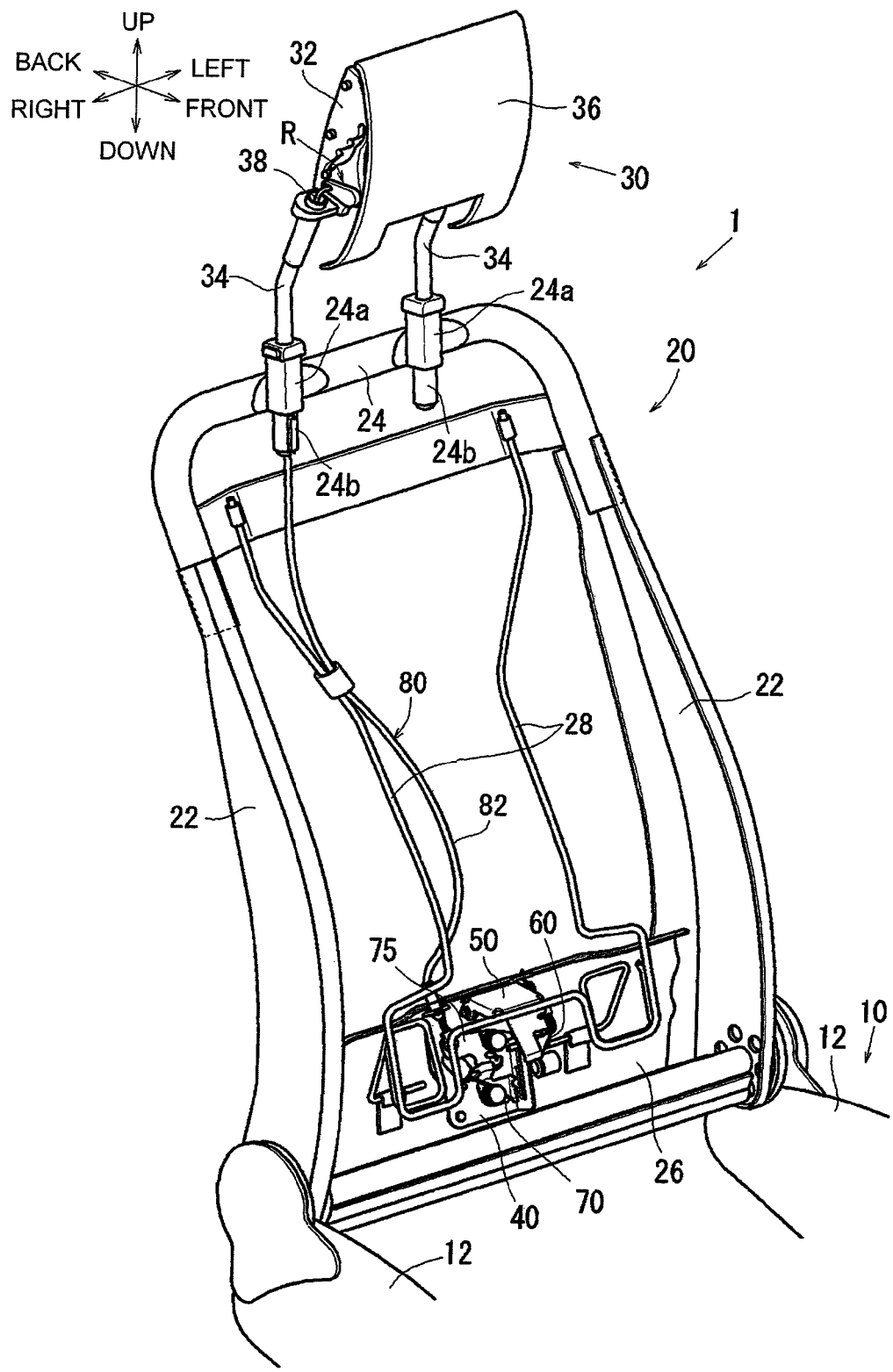
FIG. 1 is an entire schematic diagram of a vehicle seat including a clutch mechanism for a vehicle seat of an embodiment of the present invention.
Figure 2:
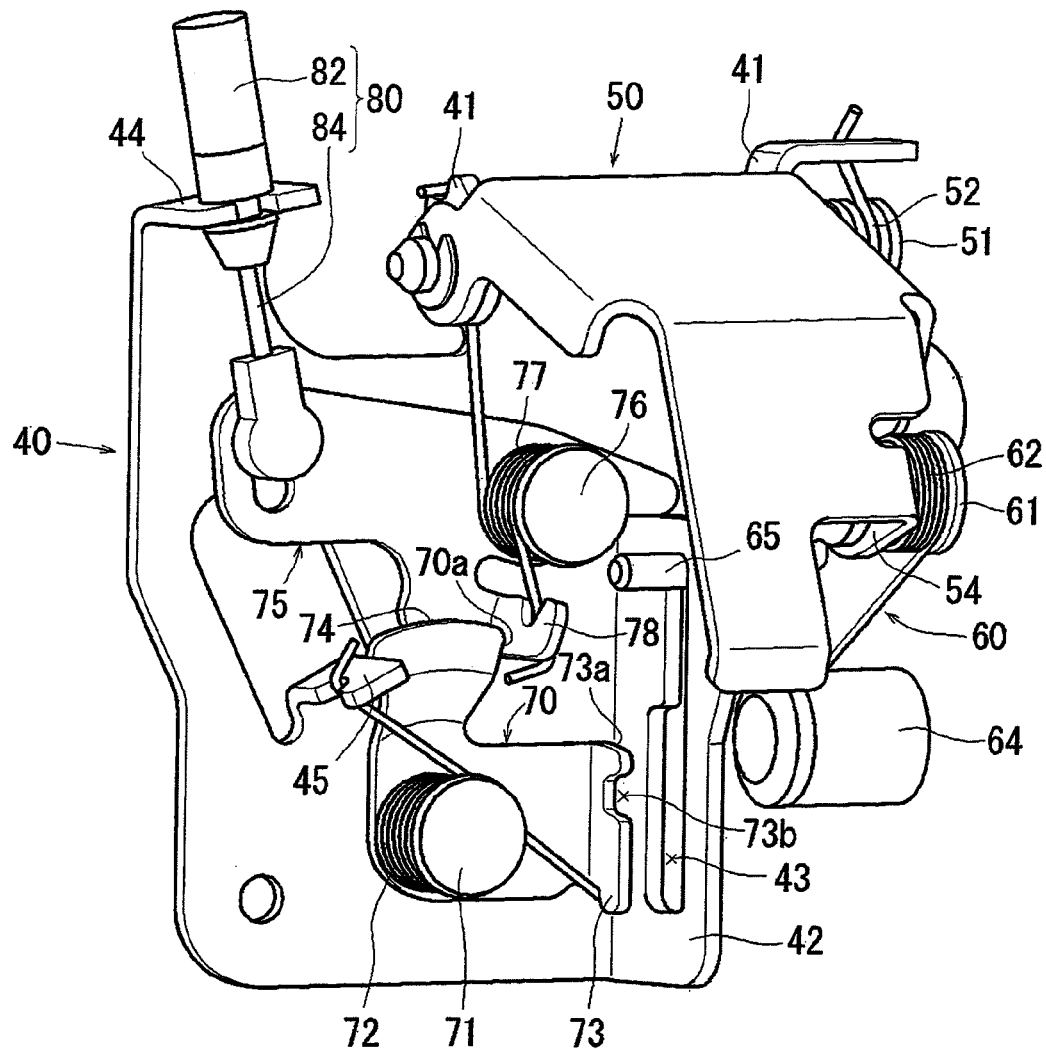
FIG. 2 is an enlarged view of the clutch mechanism of the vehicle seat.
Figure 3:
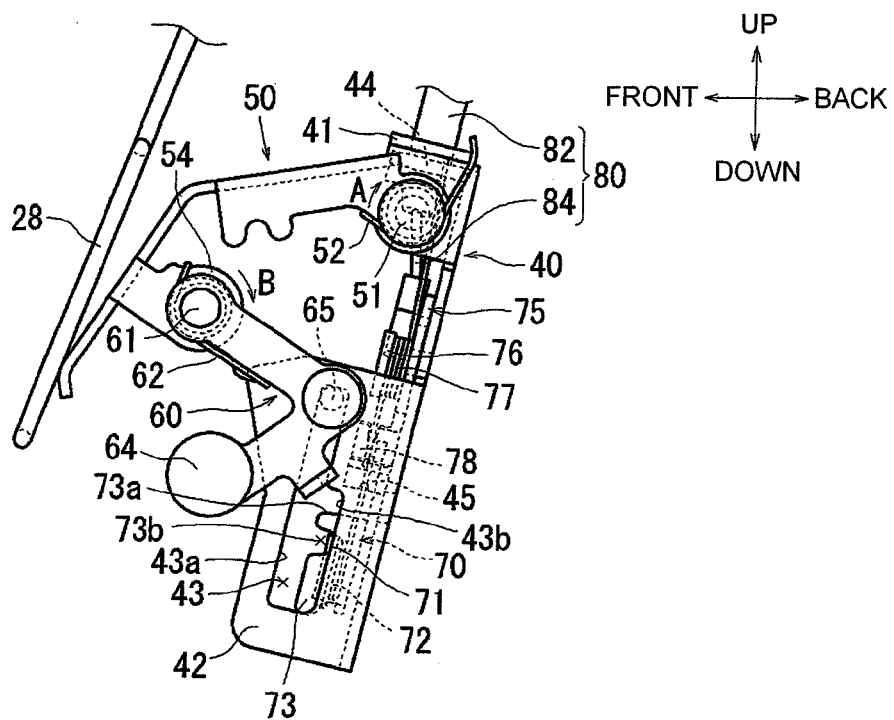
FIG. 3 is a side view of the clutch mechanism of the vehicle seat.
Figure 4:
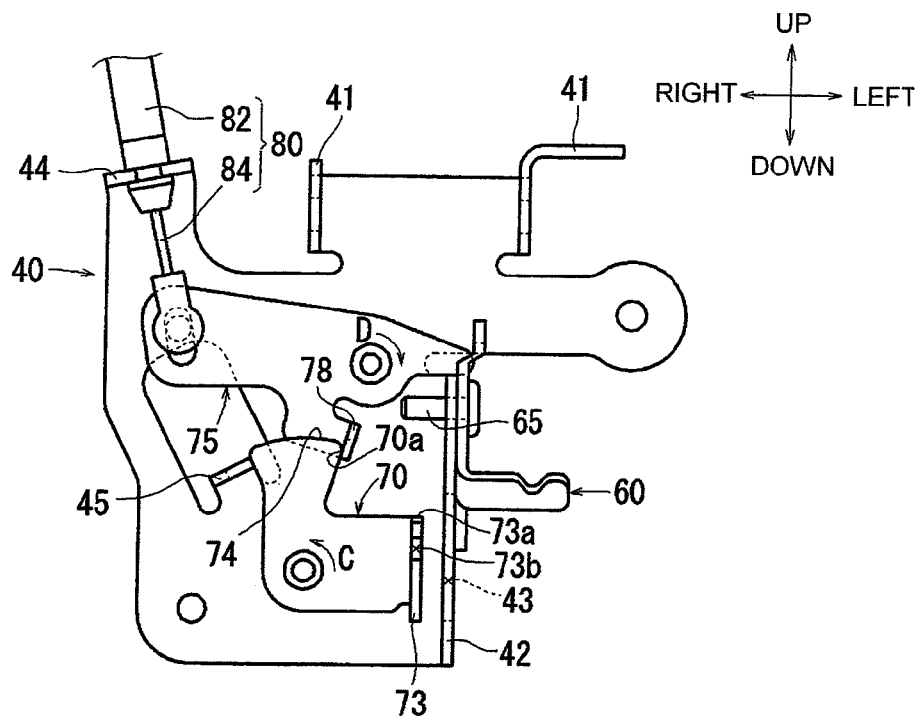
FIG. 4 is a front schematic diagram of the clutch mechanism of the vehicle seat.
Figure 5:
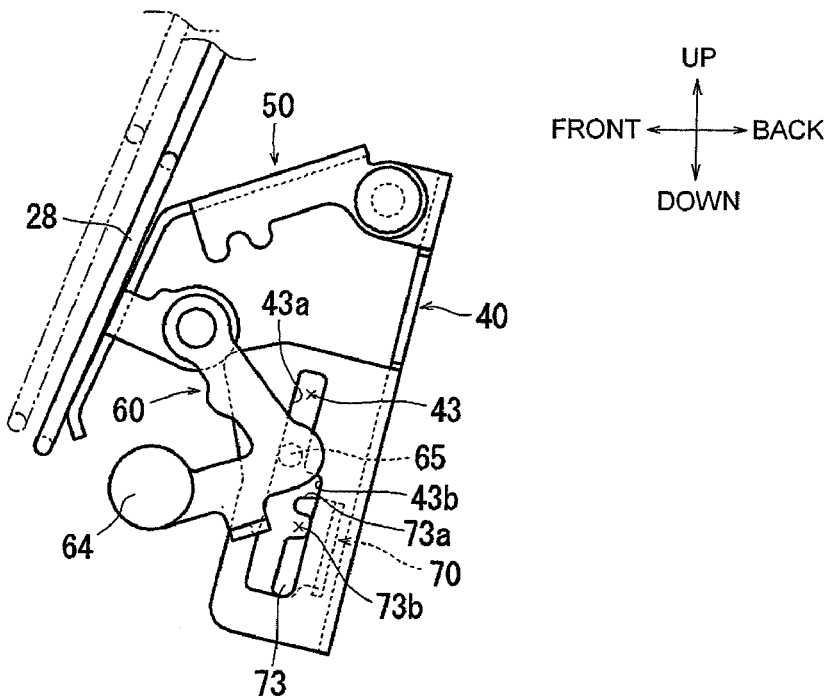
FIG. 5 is a side schematic diagram of the clutch mechanism of the vehicle seat and shows a state in which passenger's seatback load is exerted on the clutch mechanism by leaning action of a lightweight passenger.
Figure 6:
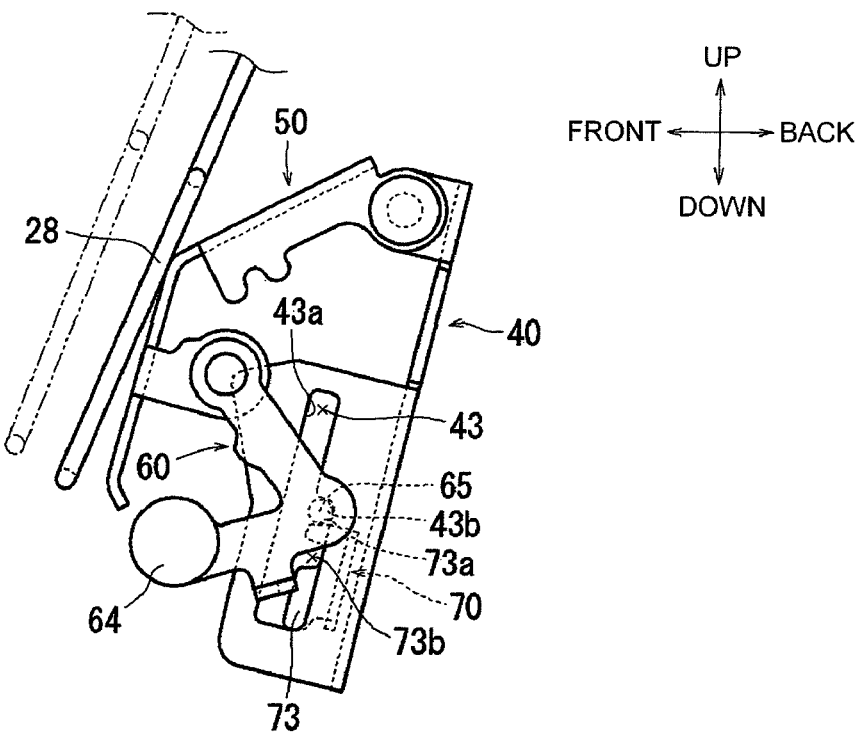
FIG. 6 is a side schematic diagram of the clutch mechanism of the vehicle seat and shows a state in which the lightweight passenger in a leaning position is pushed against a backrest due to a crash of a vehicle from behind.
Figure 7:
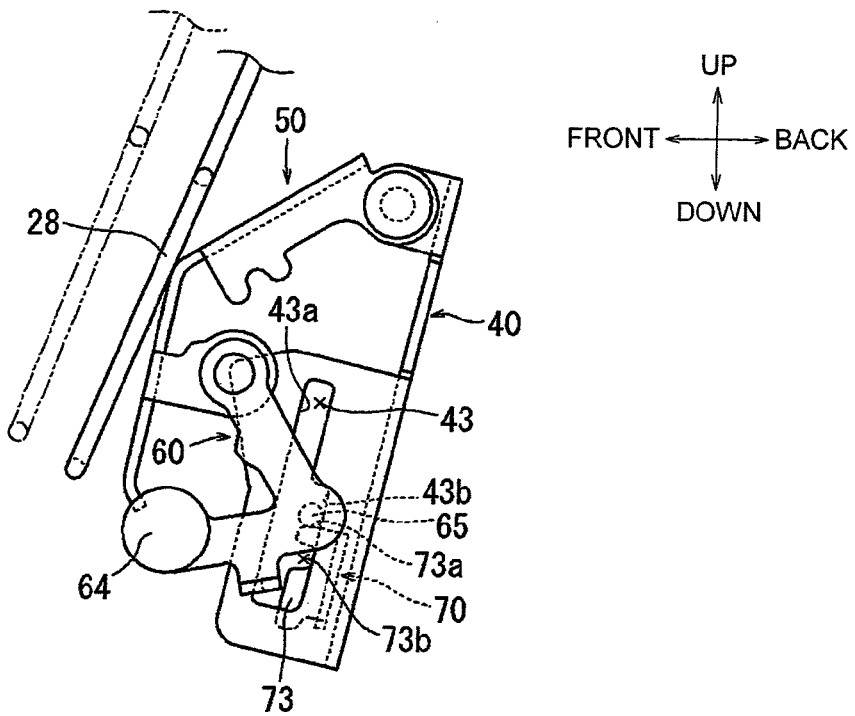
FIG. 7 is a schematic diagram of the clutch mechanisms of the vehicle seat and shows a state in which the lightweight passenger in the leaning position is further pushed from the state of FIG. 6.
Figure 8:
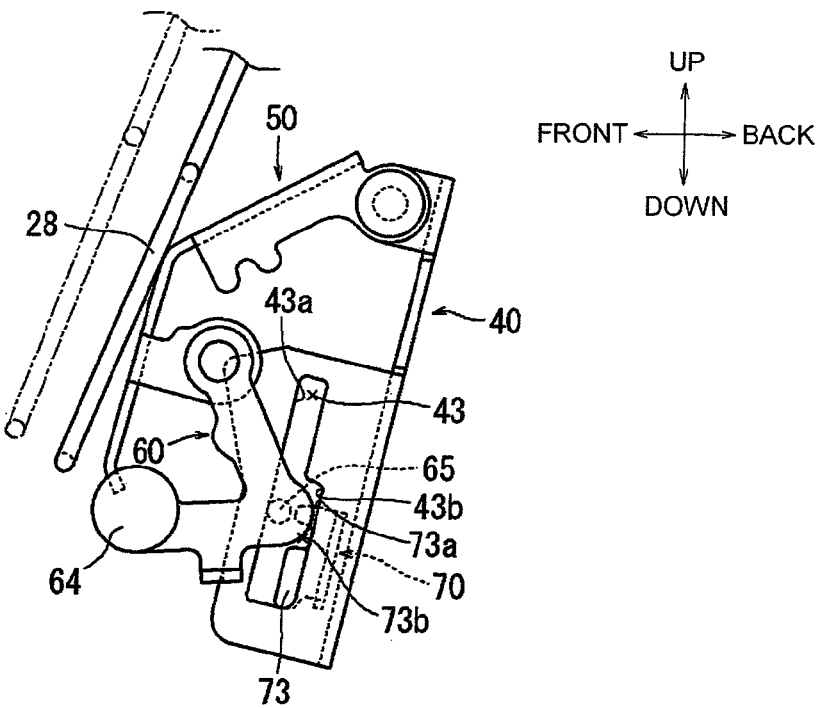
FIG. 8 is a side schematic diagram of the clutch mechanism of the vehicle seat and shows a state in which passenger's seatback load is exerted on the clutch mechanism by leaning action of a heavyweight passenger.
Figure 9:
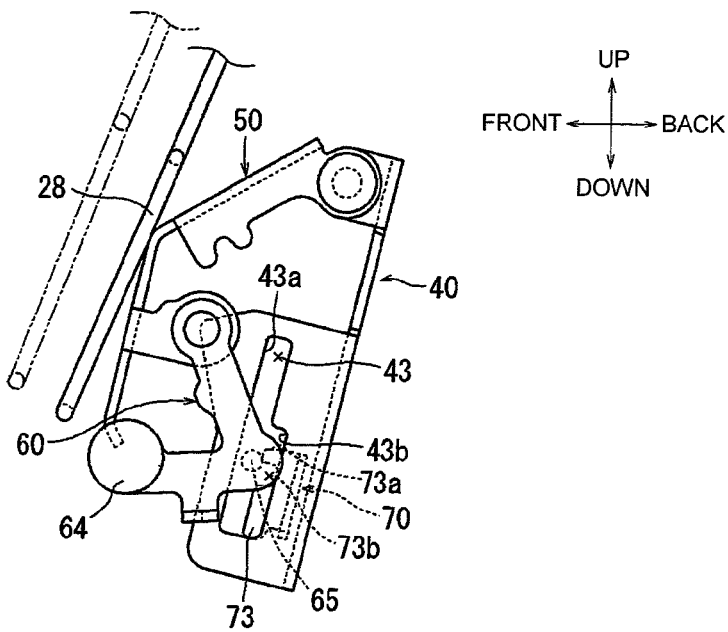
FIG. 9 is a side schematic diagram of the clutch mechanism of the vehicle seat and shows a state in which the heavyweight passenger in a leaning position is pushed against a backrest due to a crash of a vehicle from behind.
Figure 10:
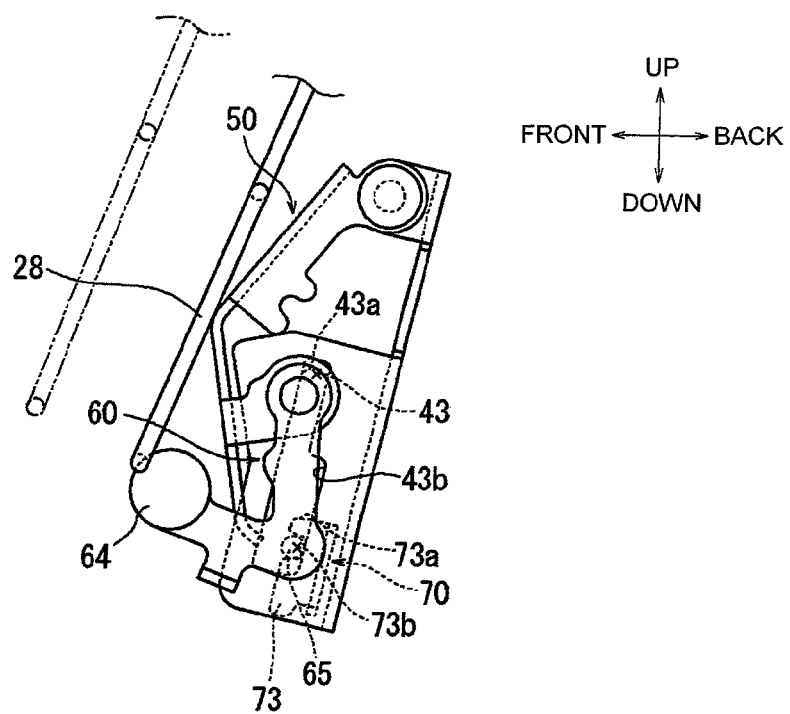
FIG. 10 is a schematic diagram of the clutch mechanisms of the vehicle seat and shows a state in which the heavyweight passenger in the leaning position is further pushed from the state of FIG. 9.

Hereinafter, exemplary embodiments of the present invention will be described by reference to FIGS. 1 through 10. FIG. 1 is an entire schematic diagram of a vehicle seat to which a clutch mechanism according to an exemplary embodiment of the present invention. FIG. 2 is an enlarged view of the clutch mechanism of the vehicle seat. FIG. 3 is a side view of the clutch mechanism of the vehicle seat. FIG. 3 is a side view of the clutch mechanism of the vehicle seat. FIG. 4 is a front schematic of the clutch mechanism. FIG. 5 is a side schematic diagram of the clutch mechanism of the vehicle seat and shows a state in which passenger's seatback load is exerted on the clutch mechanism by leaning action of a lightweight passenger;

FIG. 6 is a side schematic diagram of the clutch mechanism of the vehicle seat and shows a state in which the lightweight passenger in a leaning position is pushed against a backrest due to a crash of a vehicle from behind. FIG. 7 is a schematic diagram of the clutch mechanisms of the vehicle seat and shows a state in which the lightweight passenger in the leaning position is further pushed from the state of FIG. 6. FIG. 8 is a side schematic diagram of the clutch mechanism of the vehicle seat and shows a state in which passenger's seatback load is exerted on the clutch mechanism by leaning action of a heavyweight passenger. FIG. 9 is a side schematic diagram of the clutch mechanism of the vehicle seat and shows a state in which the heavyweight passenger in a leaning position is pushed against a backrest due to a crash of a vehicle from behind. FIG. 10 is a schematic diagram of the clutch mechanisms of the vehicle seat and shows a state in which the heavyweight passenger in the leaning position is further pushed from the state of FIG. 9.

In order to make the understanding on the internal structure of a vehicle seat 1 including a seat cushion 10, and a seatback 20 which includes an active headrest 30 easy, a cushion structure and a surface structure of the seat are omitted from FIG. 1, and only an internal frame structure is shown in FIG. 1. In the following descriptions, the terms "up," "down," "front," "back," "left," and "right" refer to "up," "down," "front," "back," "left," and "right" directions provided in the drawings, respectively; that is, "up," "down," "front," "back," "left," and "right" directions based on the vehicle seat 1.

First, the overall configuration of the vehicle seat 1 according to the exemplary embodiment of the present invention is described. As shown in FIG. 1, the vehicle seat 1 includes the seat cushion 10 on which a passenger sits, the seatback 20 for a seated passenger which includes an active headrest 30 which supports the back of the seated passenger's head.

Among these constituent members, respective frame structures of the seatback 20 and the active headrest 30 will be described in detail. The frame of the seatback 20 includes a pair of side frames 22 and 22, an upper frame 24 extending across upper portions of the respective side frames 22, and a lower frame 26 extending across lower portions of the respective side frames 22.

Lower ends of the side frames 22 are attached to rear ends of a pair of cushion frames 12 and 12 of the seat cushion 10 by means of a reclining mechanism (not shown). The seatback 20 can thereby be tilted with respect to the seat cushion 10, and the seatback 20 can be retained at a desired posture within a tiltable range thereof.

A pair of holders 24a and 24a are attached to the upper frame 24. Supports 24b which enable engaged insertion of a pair of stays 34, 34 of the active headrest 30 to be described later are attached to the holders 24a, respectively. The active headrest 30 can thereby be attached to the seatback 20.

Among the supports 24b, one support 24b (the right support 24b in FIG. 1) is provided with an unlocking member (not shown) for unlocking a lock mechanism R of the active headrest 30. The unlocking member is connected to a second swinging member 75 to be described later, via an operation cable 80. The operation cable 80 is a double-structure cable member including an outer cable 82 having a cylindrical shape and a wire-shaped inner cable 84 inserted into the outer cable 82 to be movable within the outer cable 82.

One ends (upper ends) of the outer cable 82 and the inner cable 84 of the operation cable 80 are latched to the unlocking member. When tensile force acts on the inner cable 84, the unlocking member unlocks the lock mechanism R thorough the rod 38.

The frame of the active headrest 30 includes a base 32 defining the contour of the active headrest 30, a pair of stays 34 and 34 attached integrally to the base 32, and a support plate 36 attached to the base 32 by a link mechanism and by a tension spring (not shown). In normal times when a crash of a vehicle does not occur, the support plate 36 is locked by the lock mechanism R so as to be substantially integral with the base 32 against the restoration force of the tension spring.

The support plate 36 is configured to instantaneously spring out forwardly with respect to the base 32 as a result of the link mechanism operating by the restoration force of the tension spring when the lock mechanism R is unlocked. Accordingly, it is possible to instantaneously support the back of the passenger's head. Since respective frame structures of the seatback 20 and the active headrest 30 are known configurations, their additional, detailed explanations are omitted here.

A clutch mechanism provided to the vehicle seat 1 will now be described. As shown in FIGS. 2 through 4, the clutch mechanism includes a base plate 40, a pressure-receiving member 50, a connecting arm 60, a first swinging member 70, and a second swinging member 75. The respective configuration members 40, 50, 60, 70, and 75 will be separately described below.

The base plate 40 is a member having a plate shape and constitutes a base of the clutch mechanism. The base plate 40 is fixed to a front surface of the lower frame 26. The base palate 40 is formed with a pair of first ribs 41 and 41, and a second rib 42 having an elongated hole 43.

The pressure-receiving member 50 has a substantially plate shape to be capable of receiving a seatback load from the passenger on the vehicle seat 1. The pressure-receiving member 50 is attached to the pair of first ribs 41 and 41 formed on the base plate 40 via a pin 51 so as to be rotatable around an axis extending in a widthwise direction (left-right direction) of the vehicle seat. The pressure-receiving member 50 is urged by a torsion spring 52 in a direction indicated by arrow A in FIG. 3, toward which the pressure-receiving member 50 contacts a bent spring 28 supporting a pad (not shown). The pressure-receiving member 50 is formed with a rib 54.

The connecting arm 60 has a substantially dogleg shape and transmits only a seatback load of the passenger occurring due to a crash of a vehicle from behind to the first swinging member 70 to be described later. The connecting arm 60 is provided with a pin 65 at a substantially dogleg portion thereof. The pin 65 can move within the elongated hole 43 formed in the second rib 42 of the base plate 40. Further, a weight 64 is attached to one end of the connecting arm 60.

A base end of the connecting arm 60 is attached to the rib 54 formed on the pressure-receiving member 50 via a pin 61 to be rotatable around an axis extending in the widthwise direction of the vehicle seat. The connecting arm 60 is urged by a torsion spring 62 in a direction indicated by an arrow B in FIG. 3 toward which the pin 65 of the connecting arm 60 contacts a front surface 43a of the elongated hole 43.

The first swinging member 70 transmits a seatback load from the connecting arm 60 to a second swinging member 75, which will be described later. The first swinging member 70 has a substantially L shape. The first swinging member includes a rib 73 formed at one end thereof and a circular-arc surface 74 formed on an outer peripheral surface at the other end thereof. The rib 73 is to be pushed by the pin 65 of the connecting arm 60. A longitudinal wall of the rib 73 is formed with a first cutout 73b into which the pin 65 of the connecting arm 60 can fit. In other words, the first cutout 73b is capable of receiving the pin 65 of the connecting arm 60. The circular-arc surface 74 configures a concentric circle around an axis of a pin 71 to be described later.

The first swinging member 70 is attached to the base plate via a pin 71 at a substantially-L-shaped bent portion thereof so as to be rotatable around an axis perpendicular to a surface of the base plate 40. The first swinging member 70 is urged by the torsion spring 72 toward a direction in which the other end of the first swinging member 70 contacts a second hook 45 formed on the base plate 40 (in a direction of arrow C in FIG. 4).

The second swinging member 75 is a member which pulls the operation cable 80 by the seatback load from the first swinging member 70. The second swinging member 75 is formed with a rib 78 against which an edge 70a on the other end of the first swinging member 70 is pushed. The lower end of the inner cable 84 of the operation cable 80 is latched to the second swinging member 75. The lower end of the outer cable 82 of the operation cable 80 is latched to a first hook 44 formed on the base plate 40. The operation cable 80 is an example of a transmission member.

A substantially-center portion of the second swinging member 75 is attached to the surface of the base plate 40 via the pin 76 so as to be rotatable around the axis perpendicular to the surface of the base plate 40. The second swinging member 75 is urged by a torsion spring 77 toward a direction in which the rib 78 of the second swinging member 75 contacts the edge 70a of the other end of the first swinging member 70 (in a direction of arrow D in FIG. 4).

Next, operation of the clutch mechanism will be described by reference to FIGS. 5 through 10. Explanations are provided respectively for a case where a lightweight passenger sits on the vehicle seat 1 and a case where a heavyweight passenger sits on the vehicle seat 1. First, explanations are provided for the case where the lightweight passenger sits on the vehicle seat 1.

First, the passenger simply leans back to the seatback 20 from a state shown in FIG. 3, whereupon the pressure-receiving member 50 receives a seatback load from the passenger, the connecting arm 60 rotates such that the pin 65 of the connecting arm 60 moves downwardly within the elongated hole 43. The pin 65 of the connecting arm 60 moves along the front face 43a among internal front and back surfaces of the elongated hole 43 by a restoration force of the torsion spring 62 (not shown in FIG. 5) which acts on the connecting arm 60 (see FIG. 5). Therefore, seatback load occurring from mere passenger's leaning action is not transmitted to the first swinging member 70.

Next, when the pressure-receiving member 50 receives additional seatback load from the passenger from the state shown in FIG. 5 as a result of occurrence of a crash of a vehicle from behind, the connecting arm 60 rotates such that the pin 65 of the connecting arm 60 further moves downwardly within the elongated hole 43 in the same manner as described above. Since backward inertia force remains acting on the weight 64 of the connecting arm 60 as a result of occurrence of a crash of a vehicle from behind, the pin 65 of the connecting arm 60 moves along the back surface 43b among the internal front and back surfaces of the elongated hole 43 against the restoration force of the torsion spring 62 acting on the connecting arm 60 (see FIG. 6).

Since the pin 65 of the connecting arm 60 then moves while remaining in pressed contact with an upper edge 73a of the rib 73 of the first swinging member 70. In other words, the pin 65 of the connecting arm 60 pushes the upper edge 73a of the rib 73 of the first swinging member 70. Therefore, along with this moving action, the pin 65 of the connecting arm 60 rotates the first swinging member 70 against the restoration force of the torsion spring 72 (see FIG. 7). Therefore, the seatback load occurring due to a crash of a vehicle from behind is transmitted to the first swinging member 70.

Since the edge 70a at the other end of the first swinging member 70 pushes the rib 78 of the second swinging member 75, the second swinging member 75 also rotates along with pressing action against the restoration force of the torsion spring 77. An inner cable 84 of the operation cable 80 is thereupon pulled, and tensile force acts on the thus-pulled inner cable 84. Thus, as described above, the lock mechanism R is unlocked, and the support plate 36 jumps out toward the back of the passenger's head.

Next, explanations are provided for the case where a heavyweight passenger sits on the vehicle seat 1. First, when the pressure-receiving member 50 receives seatback load from the passenger as a result of the passenger simply leaning back on the seat back 20 from the state shown in FIG. 3, the connecting arm 60 rotates such that the pin 65 of the connecting arm 60 moves downwardly within the elongated hole 43, as described above in connection with the lightweight passenger.

The pin 65 of the connecting arm 60 moves along the front surface 43a among the internal front and back surfaces of the elongated hole 43 by the restoration force of the torsion spring 62 (not shown in FIG. 8) acting on the connecting arm 60. The pin 65 of the connecting arm 60 is positioned below the upper edge 73a of the rib 73 of the first swinging member 70 (see FIG. 8). Therefore, even in this case, the seatback load induced by mere passenger's leaning action is not transmitted to the first swinging member 70.

When the pressure-receiving member 50 receives, from the state shown in FIG. 8, additional seatback load from the passenger as a result of occurrence of a crash of a vehicle from behind, the connecting arm 60 rotates such that the pin 65 of the connecting arm 60 further moves downward within the elongated hole 43 in the same manner as described above in connection with the lightweight passenger. At this time, backward inertia force remains acting on the weight 64 of the connecting arm 60 as a result of occurrence of a crash of a vehicle from behind. Hence, the pin 65 of the connecting arm 60 moves along the longitudinal wall of the rib 73 of the first swinging member 70 against the restoration force of the torsion spring 62 acting on the connecting arm 60 (see FIG. 9).

The pin 65 of the connecting arm 60 thereupon moves while fitting into (entering) the first cutout 73b of the rib 73 of the first swinging member 70. In other words, the pin 65 of the connecting arm 60 pushes the first cutout 73b of the rib 73 while entering the first cutout 73. Therefore, along with this movement, the pin 65 of the connecting arm 60 gradually rotates the first swinging member 70 against the restoration force of the torsion spring 72 as described above in connection with the lightweight passenger (see FIG. 10). Therefore, the seatback load occurring due to a crash of a vehicle from behind can be transmitted to the first swinging member 70.

The active headrest 30 can spring out toward the back of the passenger's head as described above in connection with the lightweight passenger.

According to the above-described configuration, when the lightweight passenger sits on the vehicle seat 1 or even when the heavyweight passenger sits on the vehicle seat 1, only the seatback load of the passenger occurring due to a crash of a vehicle from behind can be transmitted to the first swinging member 70. Therefore, even when the passenger varies with regard to a body size, only the seatback load of the passenger resulting from a crash of a vehicle from behind can be transmitted to the first swinging member 70.

According to the above-described configuration, the pin 65 of the connecting arm 60 pushes either one of the upper edge 73a of the rib 73 and the first cutout 73b of the rib 73 while entering the first cutout 73b to rotate the swinging member. Then, which one of the upper edge 73a of the rib 73 and the first cutout 73b of the rib 73 the pin 65 of the connecting arm 60 pushes depends on the seatback load of the passenger before the crash of the vehicle.

According to the above-described configuration, the second swinging member 75 is rotated by the seatback load transmitted to the first swinging member 70, and tensile force is exerted on the operation cable 80 by the rotating action, to thus unlock the locking mechanism R. Accordingly, the lock mechanism R can be unlocked by the rotating action of the first swinging member 70.

According to the above-described configuration, the support plate 36 can spring out toward the back of the passenger's head by the seatback load of the passenger occurring due to a crash of a vehicle from behind. Therefore, when the vehicle is crashed from behind, the support plate 36 can momentarily receive the back of the passenger's head.

While the present invention has been shown and described with reference to certain exemplary embodiments thereof, it will be understood by those skilled in the art that various changes in form and details may be made therein without departing from the spirit and scope of the invention as defined by the appended claims.

Figure 11:
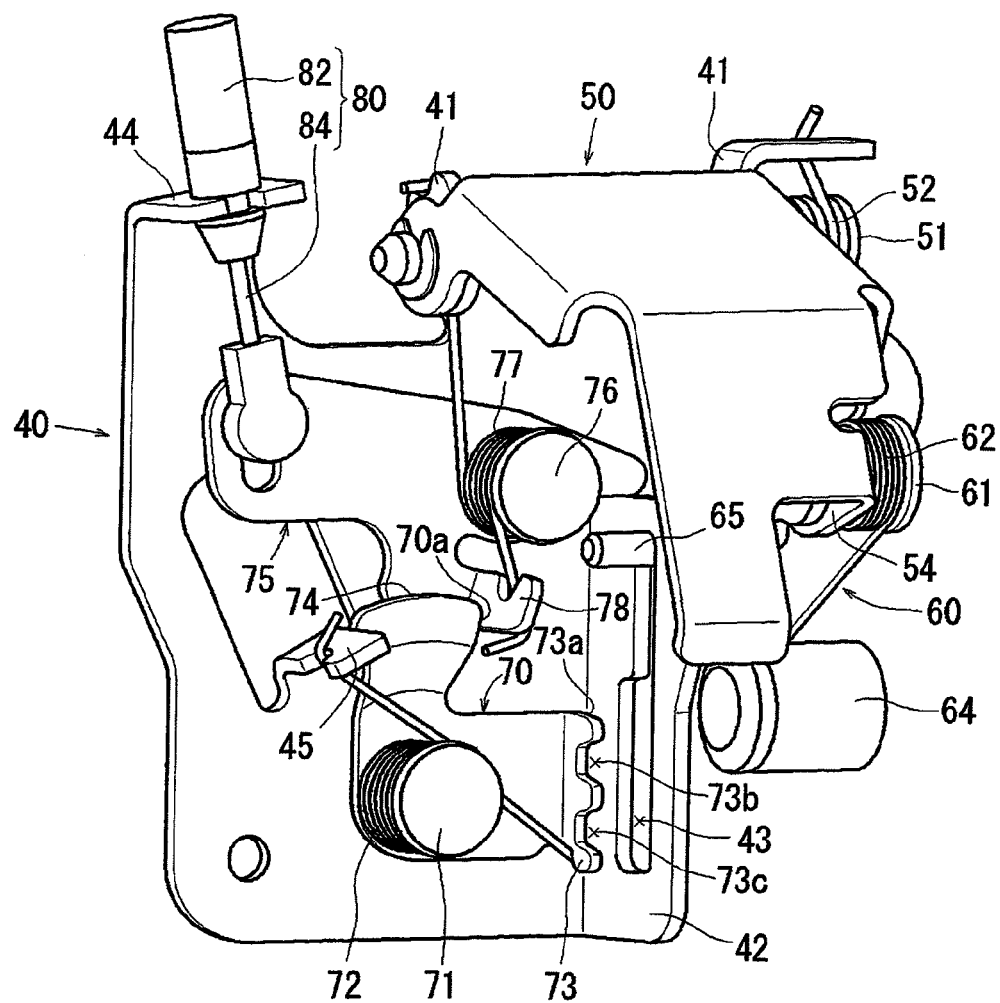
FIG. 11 is an enlarged view of a clutch mechanism of a vehicle seat of another embodiment of the present invention.

In the above-described exemplary embodiment, the first cutout 73b is formed in the longitudinal wall of the rib 73 of the first swinging member 70. However, the present invention is not limited thereto. For example, as shown in FIG. 11, a second cutout 73c may also be formed in a position below the first cutout 73b of the longitudinal wall of the rib 73 of the first swinging member 70. In other words, the rib 73 is formed with a plurality of cutouts 73b, 73c along a direction in which the pin 65 of the connecting arm 60 moves to rotate the first swinging member 70.

If the second cutout 73c is formed as described above, even when the passenger is much heavier, the pin 65 of the connecting arm 60 fits into the second cutout 73c. Therefore, the seatback load occurring due to a crash of a vehicle from behind can be transmitted to the first swinging member 70 in the same manner as in the case of the heavyweight passenger described in connection with the exemplary embodiment. Specifically, an area against which the pin 65 of the connecting arm 60 is pressed is provided at three locations; namely, the upper edge 73a, the first cutout 73b, and the second cutout 73c of the rib 73. Accordingly, the clutch mechanism can operate properly for a lightweight passenger, a heavyweight passenger, and a much heavier-weight passenger, respectively.

In the above-described exemplary embodiment, the second swinging member 75 is provided and the operation cable 80 is connected to the second swinging member 75. However, the present invention is not limited thereto. For example, the second swinging member 75 may be omitted as in the related-art clutch mechanism shown in FIG. 12.

In the above-described exemplary embodiment, the clutch mechanism is used for activating the active headrest 30. However, the present invention is not limited thereto. The clutch mechanism according to the exemplary embodiment can be used to any devices which operate in response to a crash of a vehicle from behind.

What is claimed is:

1. A clutch mechanism for a vehicle seat, the clutch mechanism comprising:
   a pressure-receiving member rotatably assembled to a frame of a seatback of the vehicle seat;
   a connecting arm having a weight and a pin, and provided rotatably to the pressure-receiving member; and
   a swinging member provided rotatably to the frame of the seatback of the vehicle seat, and including a rib which is formed with a cutout capable of receiving the pin of the connecting arm,
   wherein while inertia force occurring due to a crash of a vehicle from behind acts on the weight, when the pressure-receiving member rotates upon receipt of a seatback load of a passenger of the vehicle seat, the connecting arm moves along with the rotation of the pressure-receiving member so that the pin of the connecting arm pushes either one of (i) an edge of the rib and (ii) a cutout of the rib while entering the cutout, to rotate the swinging member.

2. The clutch mechanism according to claim 1,
   wherein which one of the edge of the rib and the cutout of the rib the pin of the connecting arm pushes depends on the seatback load of the passenger before the crash of the vehicle.

3. The clutch mechanism according to claim 1,
   wherein the frame includes a rib formed with an elongated hole in which the pin of the connecting arm is movable,
   wherein when the inertia force occurring due to a crash of a vehicle from behind acts on the weight, the pin of the connecting arm moves along a first surface of the elongated hole to push the swinging member, and
   wherein when the inertia force does not act on the weight, the pin of the connecting arm moves along a second face opposite to the first surface without pushing the swinging member.

4. The clutch mechanism according to claim 1,
   wherein the rib is formed with a plurality of cutouts along a direction in which the pin of the connecting arm moves to rotate the swinging member.

5. The clutch mechanism according to claim 1,
   wherein the seatback includes a lock mechanism,
   wherein the lock mechanism is connected to the swinging member via a transmission member, and
   wherein the lock mechanism is unlocked via the transmission member along with the rotation of the swinging member.

6. The clutch mechanism according to claim 5,
   wherein the seatback includes an active headrest assembled thereto, the active headrest including a support plate which springs toward a back of the passenger's head,
   wherein the support plate is held by the lock mechanism in an initial state achieved before the support plate springs out, and springs out toward the back of the passenger's head along with the unlocking of the lock mechanism.

* * * * *